(12) United States Patent
Chekroun

(10) Patent No.: US 7,495,622 B2
(45) Date of Patent: Feb. 24, 2009

(54) ELECTRONICALLY SCANNED WIDEBAND ANTENNA

(75) Inventor: Claude Chekroun, Gif sur Yvette (FR)

(73) Assignee: Thales, Neuilly sur Seine (FR)

( * ) Notice: Subject to any disclaimer, the term of this patent is extended or adjusted under 35 U.S.C. 154(b) by 452 days.

(21) Appl. No.: 11/302,500

(22) Filed: Dec. 14, 2005

(65) Prior Publication Data
US 2006/0244670 A1    Nov. 2, 2006

(30) Foreign Application Priority Data
Dec. 15, 2004   (FR)   ................................. 04 13343

(51) Int. Cl.
*H01Q 13/10*   (2006.01)
*H01Q 3/24*    (2006.01)

(52) U.S. Cl. ........................ 343/771; 343/876

(58) Field of Classification Search ............ 343/770, 343/771, 876
See application file for complete search history.

(56) References Cited

U.S. PATENT DOCUMENTS

| | | | |
|---|---|---|---|
| 3,220,007 A * | 11/1965 | Thourel | 343/771 |
| 4,599,623 A | 7/1986 | Havkin et al. | 343/756 |
| 4,978,962 A * | 12/1990 | Hisada et al. | 342/351 |
| 6,191,748 B1 * | 2/2001 | Chekroun et al. | 343/754 |
| 6,437,752 B1 * | 8/2002 | Chekroun | 343/754 |
| 6,670,928 B1 * | 12/2003 | Chekroun et al. | 343/754 |
| 6,703,980 B2 * | 3/2004 | Chekroun et al. | 343/755 |
| 2004/0164915 A1 | 8/2004 | Clifton et al. | 343/754 |

FOREIGN PATENT DOCUMENTS

DE    198-45-870 A1    6/1999

OTHER PUBLICATIONS

Masaharu Fujita: "An Active Reflector For Sar Calibration having a frequency shift capability" Ieice Transactions on Communications, Institute of Electronics Information and Comm. Eng. Tokyo, Jp. Aug. 1, 1992.

* cited by examiner

*Primary Examiner*—Shih-Chao Chen
(74) *Attorney, Agent, or Firm*—Lowe Hauptman Ham & Berner, LLP

(57) ABSTRACT

An electronically scanned antenna working in a wide frequency band comprises at least: one reflector panel comprising an array of phase-shifters cells; one slotted waveguide illuminating the reflector panel by a microwave having a variable frequency f. The deviation $\Delta\theta_f$ of the direction of the wave emitted by the slotted waveguide, as a function of the frequency variations, countering the variation $\Delta\theta_p$ of the aiming direction of the wave reflected by the reflector panel. The disclosed antenna can be used especially in applications requiring compact or low-cost antennas.

5 Claims, 4 Drawing Sheets

ELECTRONICALLY SCANNED WIDEBAND ANTENNA

BACKGROUND OF THE INVENTION

The present invention relates to an electronically scanned antenna working in a wide frequency band. It can be used especially in applications requiring compact or a low-cost antennas.

An electronically scanned antenna comprises a network of microwave sources associated with a phase-shifter. It is known that the direction of the antenna beam depends on the phase shifts applied by the phase-shifters to the source signals. For a given state of the phase-shifters and a given frequency, a well-defined direction of antenna beam is obtained. However, for this same state of the phase-shifters, when the sending frequency varies, there is a deflection of the antenna beam. There are many applications that require the instantaneous sending of a frequency band of varying width. This is the case especially with SAR (Synthetic Aperture Radar) type radar imaging applications. Such applications work, for example, in instantaneous bands in the range of several hundreds of MHz or even more. The use of standard electronically scanned antennas prompts a dispersal of antenna aiming with respect to frequency variations as in a sprinkling or scattering process, thus preventing especially the obtaining of precise images.

These deflections due to the frequency variations cannot be compensated for in the control of the phase-shifters because their maximum phase shift is limited to 360°. A known approach to compensating for these deflections consists then in using true delay lines. However, such an approach particularly complicates the structure of the antennas: it increases their weight and also their cost.

SUMMARY OF THE INVENTION

It is an aim of the invention especially to enable the making of an electronically scanned antenna that limits the effects of deflection due to frequency variations without making the antenna structure complex. To this end, an object of the invention is an electronically scanned antenna comprising at least:
  one reflector panel comprising an array of phase-shifters cells;
  one slotted waveguide illuminating the reflector panel by a microwave having a variable frequency f;

the deviation $\Delta\theta_f$ of the direction of the wave emitted by the slotted waveguide, as a function of the frequency variations, countering the variation $\Delta\theta_p$ of the aiming direction of the wave reflected by the reflector panel.

Preferably, the sense of the passage of the microwave in the waveguide depends on the aiming direction $\theta_p$ of the wave reflected by the panel.

To this end, the antenna comprises, for example, a selector switch having at least one input and two outputs, a first output being connected by a microwave line to an input of the slotted waveguide and a second output being connected by a microwave line to the other input of the waveguide, the switch receiving the microwave at input and switching its input over to one of the two outputs as a function of the aiming direction $\theta_p$.

Advantageously, the slotted waveguide is placed at the level of the reflector panel so that the slots are positioned in the plane of the array of the phase-shifter cells, the waves sent by the waveguide being reflected by a system of conductive wires toward the reflector panel.

A second slotted waveguide is, for example, positioned beside the slotted waveguide to form two beams of a monopulse antenna.

Advantageously, the slotted waveguide is, for example, corrugated.

The main advantages of the invention are that it can makes it possible to obtain a compact antenna, can be used in numerous applications and is economical.

BRIEF DESCRIPTION OF THE DRAWINGS

Other features and advantages of the invention shall appear from the following description made with reference to the appended drawings, of which.

MORE DETAILED DESCRIPTION

Figure 1:
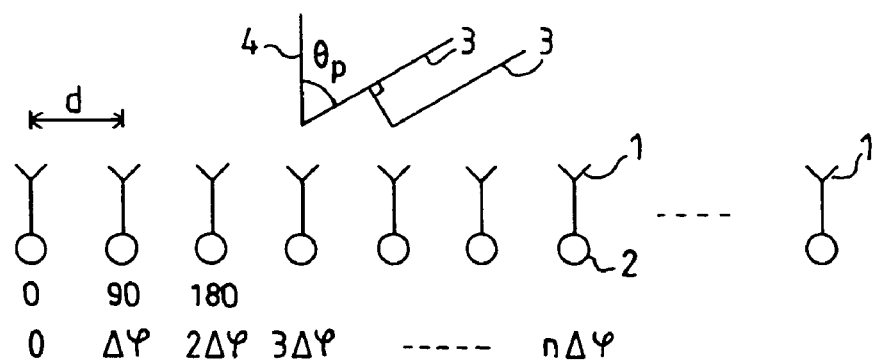
FIG. 1 illustrates the principle of operation of an electronically scanned antenna.

FIG. 1 recalls the principle of operation of an electronically scanned antenna. The antenna has an array of microwave sources 1 or radiating elements. Each element 1 is connected to a phase-shifter 2. At emission, the microwave signals designed to be sent by the sources are first of all phase-shifted by the phase-shifters 2 to according to a well-established law that defines the aiming direction 3 of the antenna beam. This direction 3 is defined by an aiming angle $\theta_p$ relative to the axis 4 of the antenna, this direction 4 being perpendicular to the plane of the antenna. The array shown in FIG. 1 is linear, but it also represents a plane array where each source actually represents an element of a line of the array where all the sources of this line have the same phase shift.

It is also possible to apply a zero phase shift or a reference phase shift to the first line, represented by the first source of the array of FIG. 1. Then, the phase is incremented by one phase shift $\Delta\phi$ from one source to the next one, or from one line to the next one. Thus, in the example of FIG. 1, a first source has a zero phase shift, the second source has a $\Delta\phi$ phase shift, the third source has a $2\Delta\phi$ phase shift and so on and so forth until the nth source which has a phase shift of $(n-1)\Delta\phi$. The direction of the antenna beam or, more particularly, the aiming angle $\theta_p$ of the beam is defined by the following relationship:

$$\frac{2\pi d \sin\theta_p}{\lambda} = \Delta\varphi \qquad (1)$$

where d represents the pitch or distance between two sources 1 and λ the wavelength of the signal sent.

For example, if d=λ/2 and Δφ=π/2 then $\theta_p$=π/6.

Figure 2:
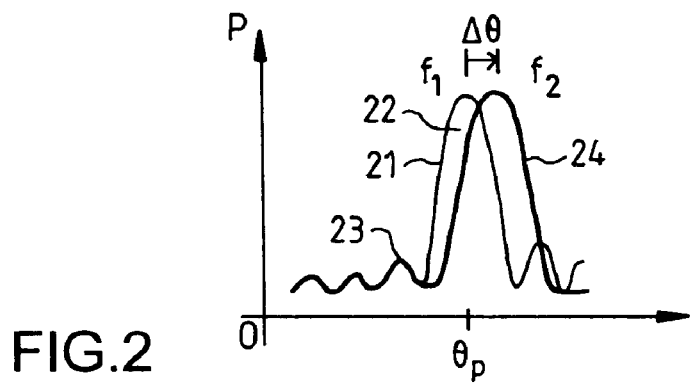
FIG. 2 illustrates the aiming angle of an antenna lobe as a function of the frequency.

FIG. 2 illustrates the lobe of the antenna of FIG. 1 for an aiming angle $\theta_p$ as defined by the relationship (1) for a first antenna frequency $f_1$, this frequency being the signal at emission or at reception. In this case, in the relationship (1) we must take λ=$\lambda_1$=c/$f_1$, c being the speed of light.

This antenna lobe is represented by a first curve 21 centered on the angle $\theta_p$ in a system of axes where the y-axis values represent the microwave power and where the x-axis values represent the angles relative to the axis 4 of the antenna, the latter corresponding to the angle 0. The curve 21 illustrates a classic antenna lobe, with its major lobe 22 flanked by its minor lobe 23.

From the relationship (1) itself, it is deduced that a variation of frequency, hence one with a wavelength λ prompts a variation of the aiming angle $\theta_p$. Indeed, for a constant antenna state, Δφ is constant. It follows therefrom that the first term of the relationship (1) is constant and therefore that its differential is zero, which is expressed by:

$$-\frac{\Delta \lambda}{\lambda} + \frac{\Delta(\sin\theta_p)}{\sin\theta_p} = 0 \quad (2)$$

whence the variation of deflection $\Delta\theta_p$ is deduced as a function of the frequency variation Δf, approximately by the following relationship:

$$\Delta\theta_p = -tg\theta_p \cdot \frac{\Delta f}{f} \quad (3)$$

For example, if the nominal aiming angle is equal to π/4, it follows that:

$$\Delta\theta_p = -\frac{\Delta f}{f} \quad (4)$$

In FIG. 2, a second curve 24 illustrates the antenna lobe for a second antenna frequency $f_2$. The two lobes 21, 24, one at the frequency $f_1$ and the other at the frequency $f_2$, are offset by $\Delta\theta_p$. It can then be seen that the frequency variations within a given frequency band will prompt a dispersal of the aiming of the antenna beam. This antenna beam loses its directivity, and emission or reception then takes place as in a sprinkling or scattering process.

Figure 3:
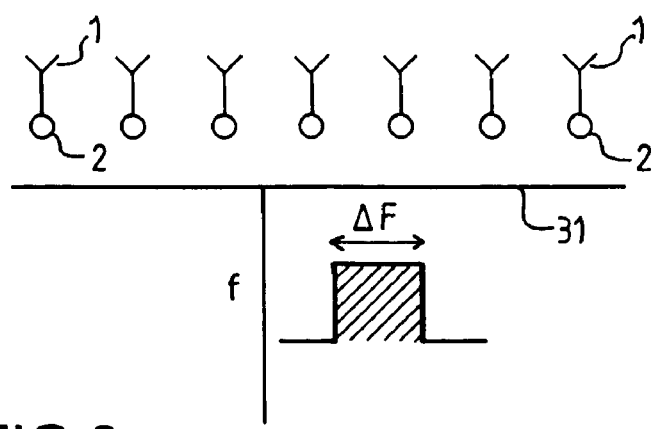
FIG. 3 is a drawing of an electronically scanned antenna that can be used in an SAR type radar.

In FIG. 3, a simplified diagram illustrates an electronically scanned antenna which may be used, for example, for an SAR type application. As in the antenna of FIG. 1, this antenna has an array of radiating elements 1 controlled by phase-shifters 2. The microwave signal at the frequency f is fed to the radiating elements 1 through the phase-shifters 2 by means of a distribution circuit 31. The frequency f moves across a frequency band ΔF whose width, for example, is in the range of 1 GHz. With a bandwidth of this order, an SAR type radar may deliver synthetic images having a resolution of about 20 cm. The frequency variations within this band ΔF prompt a dispersal of the antenna aim as illustrated in FIG. 2. The antenna is no longer directional but dispersive. The maximum deflection $\theta_{pMax}$ prompted by a frequency variation equal to this bandwidth ΔF is given by the following relationship:

$$\Delta F = \frac{360}{(\sin\theta_{pMax}) \times L} \quad (5)$$

where ΔF is in megahertz (MHz) and L in meters (m). For example, if: ΔF=1000 and L=1, then $\sin(\theta_{pMax})$=0.36, giving $\theta_{pMax}$=21°.

It has been indicated here above that, to compensate for this deflection, prior art solutions make use of delay lines. The delay lines used are true delay lines and not simple phase-shifters. However, these delay lines induce losses. It is therefore necessary, in addition, to compensate for these losses by amplifiers. Ultimately, the antenna structure is more complex, bulkier and costlier.

Figure 4:
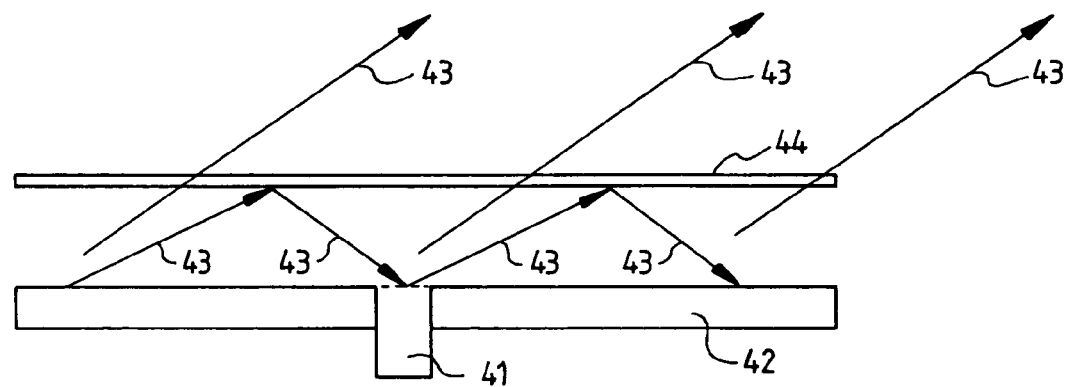
FIG. 4 is a simplified view in section exemplifying an embodiment of an antenna according to the invention,
  FIG. 5 exemplifies a waveguide used in an antenna according to the invention,
  FIGS. 6a and 6b respectively illustrate, as a function of the frequency, the deviation of a wave emitted by a waveguide and the deflection of the beam of an electronically scanned antenna.

FIG. 4 is a view in section presenting an exemplary embodiment of an antenna according to the invention. This antenna uses a reflector panel with phase-shifter cells used especially in "reflect array" or "transmit array" type antennas.

The antenna comprises at least one slotted microwave waveguide 41 and one microwave reflector panel 42, the slotted waveguide 41 having an illuminator function. The reflector panel 42, also called a "reflectarray" panel is an array of electronically controllable phase-shifters. An example of a reflector panel is presented especially in the US patent application published under U.S. Pat. No. 6,191,748. Examples of microwave reflector panels or reflectarray panels are also described in the US patent applications published under U.S. Pat. Nos. 6,437,752, 6,670,928 and 6,703,980. A primary source illuminates the reflectarray. It emits microwaves toward the reflectarray panel. This panel has an array of elementary cells that reflect and phase-shift the waves that they receive. By controlling the phase shifts imprinted on the waves received by each cell, it is possible, as is known in the prior art, to form a microwave beam in a desired direction. The principle of control of the antenna beam is the same as in the examples described in FIGS. 1 and 3 except that a microwave signal is phase-shifted when it is reflected on the panel.

The slotted waveguide 41 is powered by a microwave in progressive mode. It radiates a microwave 43 to the reflector panel 42. In the particular embodiment of FIG. 4, the slots of the waveguide 41 are in the plane of the reflector panel 42. The waves 43 emitted by the slots are then reflected, for example by a panel 44 with conductive wires to the panel 42. The waves 43 are then reflected by the panel with phase shifts as described here above before crossing the system of wires 44. The structure of such a panel is known as a "transmit array" structure.

Such an antenna according to the invention enables compensation for antenna beam deflections caused by frequency variations without the use, in particular, of delay lines. It therefore has a structure that is not complex. Advantageously according to the invention the dispersal defect of an electronically scanned antenna is compensated for by another defect, namely that of a slotted waveguide as illuminator.

Figure 5:
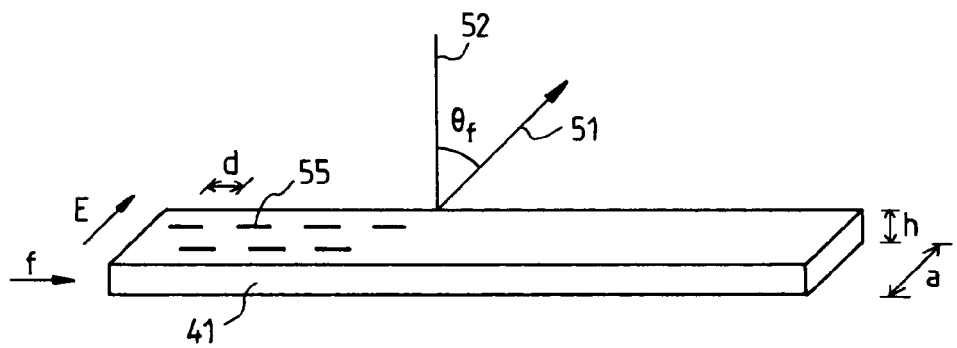

FIG. 5 exemplifies a slotted waveguide 41 that can be used in an antenna according to the invention to illuminate the reflector panel 42. The waveguide 41 has a width a and a height h. The slots 55 are positioned on one of the sides having a width a. The pitch or spacing between the centers of two successive slots is equal to d. The waveguide is supplied with a wave having frequency f in progressive mode. The electrical component E of the electromagnetic field is parallel to the side having a width a.

The exemplary waveguide of FIG. 5 is a flat waveguide, i.e., h is smaller than a. The cut-off frequency of the waveguide is equal to $f_c=c/\lambda_c$ and $\lambda_c=2a$.

A slotted waveguide has a defect illustrated in FIG. 5: the direction 51 of the microwave emitted by the slots 55 is not perpendicular to the plane of the slots but forms an angle $\theta_f$ relative to the axis 52 of the waveguide, this axis being perpendicular to the plane of the slots 55. Furthermore, this angle varies with the frequency f of the microwave according to the following relationship:

$$\sin\theta_f = \sqrt{1-\left(\frac{\lambda}{\lambda_c}\right)} - \frac{\lambda}{2d} \quad (6)$$

where $\lambda=c/f$.

The relationship (6) shows that $\sin(\theta_f)$ decreases when $\lambda$ increases. In other words, the angle $\theta_f$ increases with the frequency fs supplied to the slotted waveguide 41.

Figure 6A:
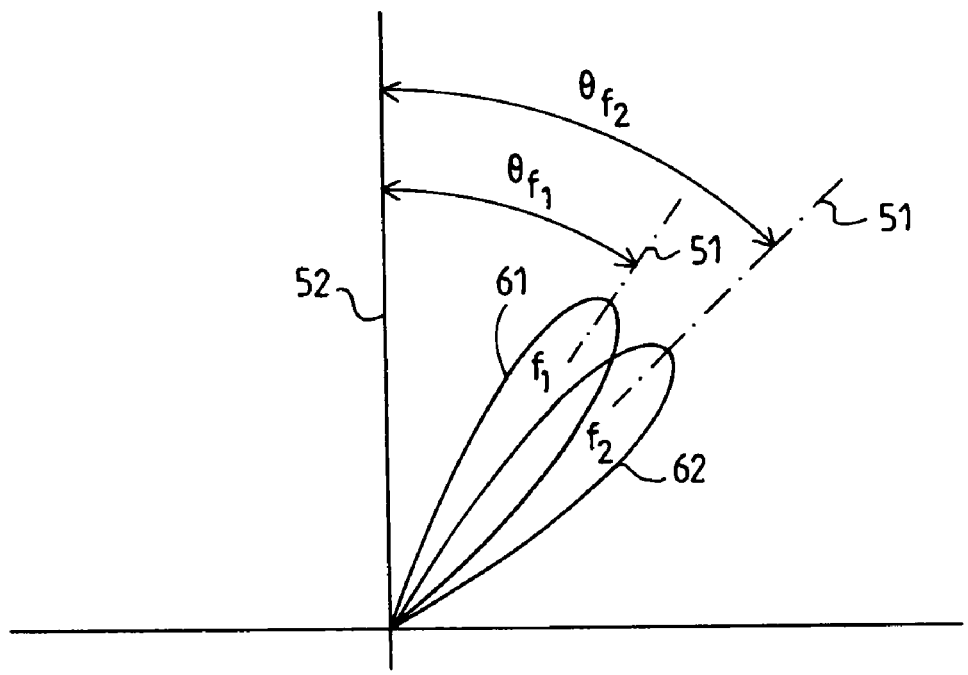

FIG. 6a illustrates two emitted beams 61,62 for two waves emitted by the slotted waveguide, one at the frequency $f_1$ and the other at the frequency $f_2$, with $f_2$ being greater than $f_1$. The first beam 61 corresponding to the first frequency $f_1$ forms an angle $\theta_{f1}$ relative to the axis 52 of the slotted waveguide. The second beam 62, corresponding to the second frequency $f_2$ forms an angle $\theta_{f2}$ relative to this same axis 52. The angle $\theta_{f2}$ is greater than the angle $\theta_{f1}$.

Figure 6B:
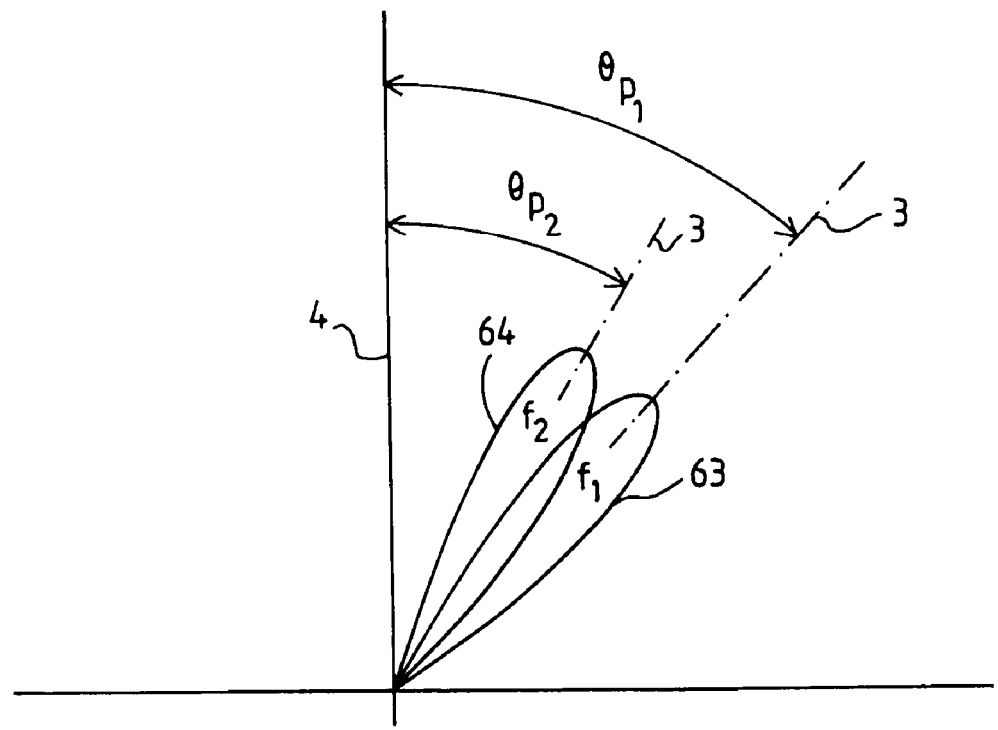
Figure 8:
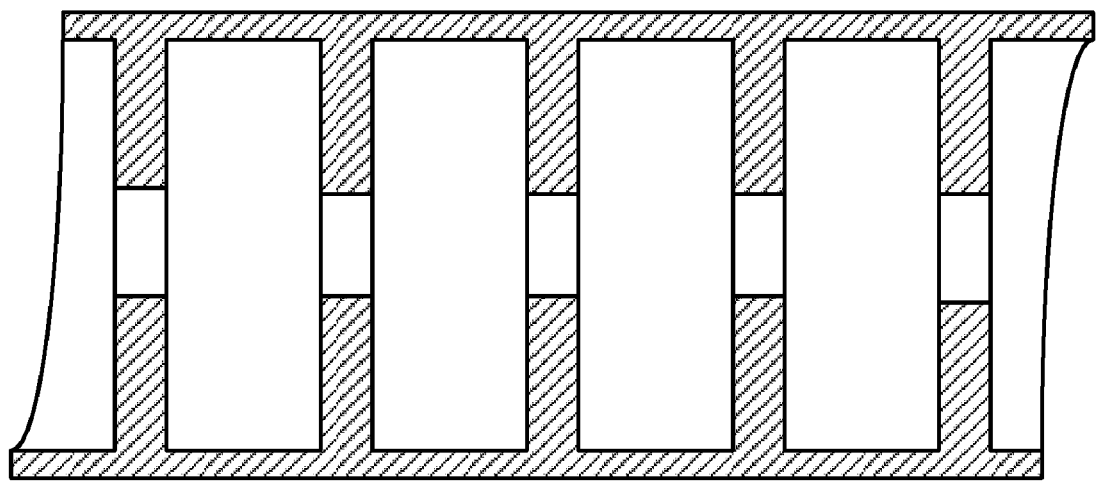
FIG. 8 depicts an example of a corrugated slotted waveguide.
Figure 9:
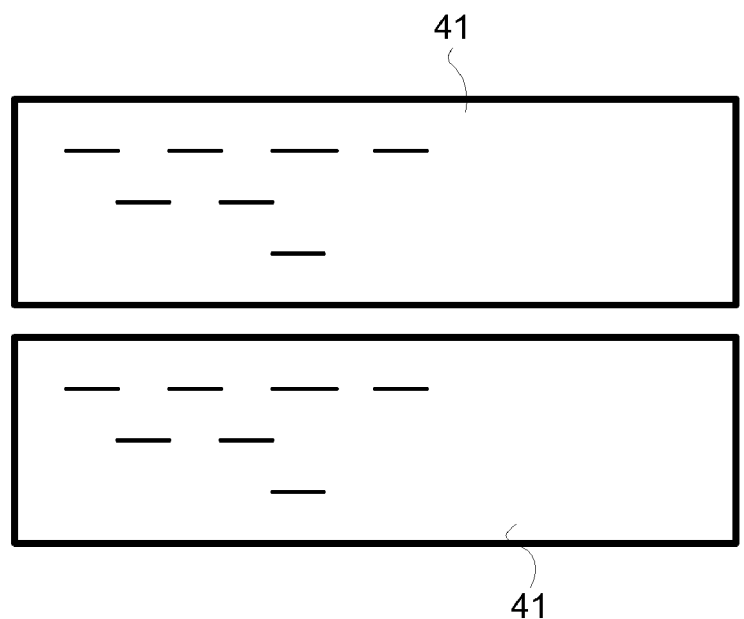
FIG. 9 schematically depicts two slotted waveguides disposed side-by-side.

FIG. 6b illustrates the deflection of an antenna beam relative to a reference axis 4, this deflection being due to the frequency variation. This deflection may relate to an antenna as illustrated schematically in FIGS. 1 and 3. For the same physical reasons, it also pertains to a reflector panel of the type 42 used in an antenna according to the invention. FIG. 6b presents two beams 63, 64 for the two frequencies f1, f2 mentioned here above. The first beam 63 corresponding to the first frequency f1 forms an angle θp1 relative to the reference axis 4. The second beam 64 corresponding to the second frequency f2 forms an angle θp2 relative to this same axis 4. In this case, and in compliance with the relationship (4) especially, the aiming angle of the beam gets smaller as the efficiency rises. For a same variation of the frequency f, the aiming angle θp of the reflector panel 42 therefore varies in opposition to the angle θf of deviation of the slotted waveguide 41. Thus, FIG. 6b shows that the angle θp2 is smaller than the angle θp1.

It is possible to play on the parameters of the waveguide, especially the spacing or pitch d between the slots and its width a so that, for a same frequency variation f, the deviation $\Delta\theta_f$ of the direction 51 of the wave emitted by the waveguide compensates to the greatest possible extent for the variation in aiming angle $\Delta\theta_p$ of the wave reflected by the reflector panel 42. In particular, the ideal would be to define the parameters of the slotted waveguide 41 so that $\Delta\theta_f=-\Delta\theta_p$.

Even if this is not possible in practice, it is possible to partly compensate for the deflection $\Delta\theta_p$, at least in order to advantageously reduce its effects.

Figure 7:
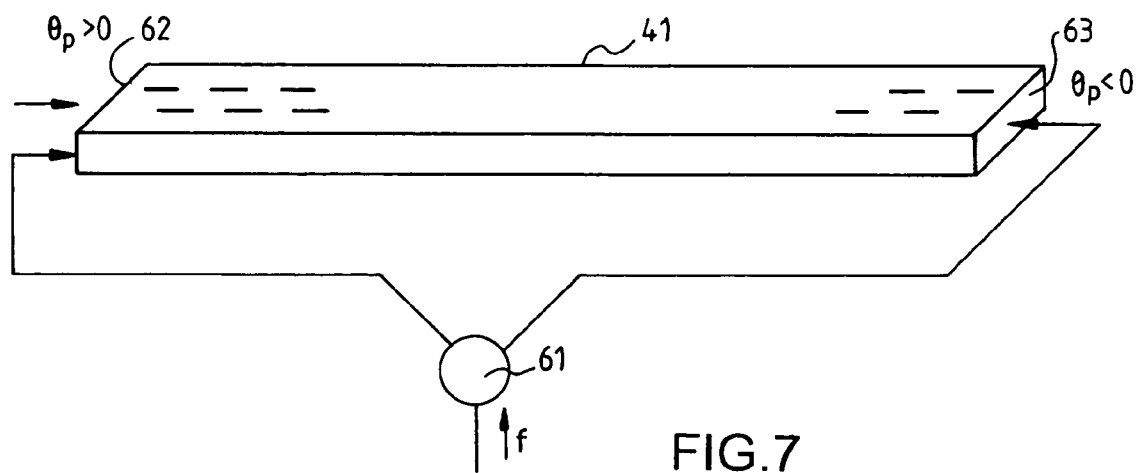
FIG. 7 shows a possible embodiment by which the sense of the passage of a microwave in a waveguide can be inverted.

FIG. 7 presents only the illuminator part of an antenna according to the invention in an embodiment that takes account of the sense of the deflection. The sense of the deflection is positive when $\theta_p$ is positive and the sense of the deflection is negative when $\theta_p$ is negative. When the sense of the deflection changes, it is not the same for the deviation $\Delta\theta_f$. To compensate for the variation in the aiming angle $\Delta\theta_p$ it is therefore necessary also to obtain a change in the sense of the deviation $\Delta\theta_f$. For this purpose, it is necessary to play on the sense of the microwave signal within the waveguide because the sense of the deviation depends on the sense of travel of the microwave signal in the waveguide.

To this end, an antenna according to the invention may comprise a selector switch, for example an electromechanical switch 61. This selector switch 61 has an input that receives the wave at the frequency f. It also has two outputs. A first output is connected by a microwave line to an input 62 of the slotted waveguide 41 and a second output is connected by a microwave line to the other input 63 of the slotted waveguide. The selector switch switches over the input signal from one output to the other as a function of the sense of the deflection $\theta_p$. Thus, when the angle of the deflection $\theta_p$ is positive, the microwave signal enters one input 62 and when the angle of the deflection $\theta_p$ is negative, the microwave signal enters the other input 63. The selector switch 61 is, for example, controlled by a control unit which also controls the phase shift of the cells of the reflector panel 42. In particular, this control unit, which commands the aiming angle $\theta_p$, knows its sign as a matter of fact and can therefore control the switch-over of the selector switch 61 accordingly.

Having described the working of an antenna according to the invention, we now return to the particular exemplary embodiment of FIG. 4. In this "transmit array" type of embodiment, the illuminator, constituted by the slotted waveguide 41, is therefore placed at the level of the reflector panel 42. More particularly, the outputs of the slots of the waveguide are in the plane of the array of the phase-shift cells of the reflector panel. In this embodiment, the slotted waveguide 41 illuminates the reflector panel by reflection on a system of conductive wires 44. The system of wires is placed facing the reflector panel 42 and parallel to this panel. The system of wires is, for example, placed at a distance of some centimeters from the reflector panel. The wave 43 emitted by the slots reflected by the system of wires and then gets reflected again on the reflector panel 42, in a direction depending on the phase shift is applied by the cells. The variation in aim $\Delta\theta_p$ created by the frequency variations f of the wave 43 is compensated partly by the deviation $\Delta\theta_f$ of this same wave 43 at output of the slotted waveguide. After reflection on the reflector panel 42, the wave goes through the system of wires 44. The direction of the antenna beam thus created depends on the control of the phase-shifters, the variation of aiming as a function of the frequency being partly corrected as indicated here above. The system of wires 44 is made so as to reflect the wave 43 at output of the slotted waveguide and so as to let through the wave after reflection on the reflector panel 42. To this end, the wires are for example perpendicular to the electrical field E of the wave 43. When this wave gets reflected on the reflector panel, a π/2 rotation gets applied to this field E. It then becomes parallel to the conductive wires of the system 44. The wave reflected by the panel 42 then goes through the system of wires 44. The means used to keep the system of wires 44 fixedly joined to the reflector panel 42 are not shown in FIG. 4. Several modes of attachment may be used. With the system of wires being itself positioned on a panel made of dielectric material, this panel may be fixedly joined to the reflector panel by struts or spacers for example. The system of wires is, for example, printed on the dielectric panel in a printed circuit type of technology.

The exemplary embodiment of FIG. 4 is of a "transmit array" type. This embodiment has the advantage especially of being compact, and therefore having low space requirement. In this case, the illuminator is no longer placed at the level of the reflector plane. The waveguide 41 is then placed so as to be facing the reflector panel. In addition to the aspect of space requirement, the "reflect array" type solution may be less advantageous than the "transmit array" solution because in this embodiment, the waveguide 41 masks the reflector panel in the front, in the emission or reception field of the antenna.

In a "transmit array" type of embodiment, the waveguide masks a part of the phase-shifter array or rather it eliminates a part of it. One approach to reducing this masked part is to use a slotted waveguide known as a "corrugated" waveguide. A slotted corrugated waveguide is a slotted waveguide having a protrusion part in its interior. Its utility especially is that it has a lower cut-off frequency and therefore has a smaller width, thus reducing the mask of the illuminator.

It is possible to create a monopulse type antenna by aligning two slotted waveguides side-by-side. Two antenna beams are thus created to form a monopulse channel.

An antenna according to the invention thus makes it possible to avoid the use of delay lines to compensate for antenna deflection due to variations in frequency. It thus provides for a compact and low-cost embodiment. In particular, an antenna as illustrated in FIG. 4 may have a small thickness. In the X band for example, the thickness does not exceed 10 centimeters for an approximate size of 1.5 meters×1.5 meters.

Especially because of its performance, low space requirement and low cost, an antenna according to the invention may be used for many applications. In particular, it may be used in drones, for example for SAR type radar imaging applications. It can also be used for radar imaging applied to surveillance, for example for the surveillance of air corridors in large airports.

What is claimed is:

1. An electronically scanned antenna comprising at least:
   one reflector panel comprising an array of phase-shifters cells;
   one slotted waveguide illuminating the reflector panel by a microwave having a variable frequency f;
   the deviation $\Delta\theta_f$ of the direction of the wave emitted by the slotted waveguide, as a function of the frequency variations, countering the variation $\Delta\theta_p$ of the aiming direction of the wave reflected by the reflector panel,
   wherein the sense of the passage of the microwave in the waveguide depends on the sense of the aiming ($\theta_p$) of the wave reflected by the panel, and which further comprises:
   a selector switch having at least one input and two outputs, a first output being connected by a microwave line to an input of the slotted waveguide and a second output being connected by a microwave line to the other input of the waveguide, the switch receiving the microwave at input and switching its input over to one of the two outputs as a function of the sense of aiming ($\theta_p$).

2. An antenna according to claim 1, wherein the slotted waveguide is placed at the level of the reflector panel so that slots of the slotted waveguide are positioned in the plane of the array of the phase-shifter cells, the waves emitted by the waveguide being reflected by a system of conductive wires toward the reflector panel.

3. An antenna according to claim 1, wherein a second slotted waveguide is positioned beside the slotted waveguide to form two beams of a monopulse antenna.

4. An antenna according to claim 1, wherein the slotted waveguide is corrugated.

5. An antenna according to claim 1, used for SAR type synthetic imaging radar applications.

* * * * *